(12) United States Patent
Fröhlich

(10) Patent No.: US 12,492,931 B2
(45) Date of Patent: Dec. 9, 2025

(54) METHOD FOR VERIFYING A CLAMP-ON ULTRASONIC MEASURING DEVICE

(71) Applicant: Endress+Hauser Flowtec AG, Reinach (CH)

(72) Inventor: Thomas Fröhlich, Münchenstein (CH)

(73) Assignee: Endress+Hauser Flowtec AG, Reinach (CH)

( * ) Notice: Subject to any disclaimer, the term of this patent is extended or adjusted under 35 U.S.C. 154(b) by 380 days.

(21) Appl. No.: 18/249,361

(22) PCT Filed: Sep. 13, 2021

(86) PCT No.: PCT/EP2021/075129
§ 371 (c)(1),
(2) Date: Apr. 17, 2023

(87) PCT Pub. No.: WO2022/078686
PCT Pub. Date: Apr. 21, 2022

(65) Prior Publication Data
US 2025/0027805 A1    Jan. 23, 2025

(30) Foreign Application Priority Data
Oct. 16, 2020    (DE) ............. 10 2020 127 360.6

(51) Int. Cl.
*G01F 25/10* (2022.01)
*G01F 1/66* (2022.01)
*G01F 1/667* (2022.01)

(52) U.S. Cl.
CPC ............. *G01F 25/10* (2022.01); *G01F 1/667* (2013.01); *G01F 1/66* (2013.01)

(58) Field of Classification Search
CPC ............. G01F 25/10; G01F 1/667; G01F 1/66
(Continued)

(56) References Cited

U.S. PATENT DOCUMENTS

2015/0260556 A1    9/2015    Schaefer et al.
2017/0350865 A1*  12/2017    Kretzler ............... G01F 15/022

FOREIGN PATENT DOCUMENTS

CN    104870950 A1    8/2015
CN    111566455 A1    8/2020
(Continued)

*Primary Examiner* — Peter J Macchiarolo
*Assistant Examiner* — John M Royston
(74) *Attorney, Agent, or Firm* — Christopher R. Powers; Endress+Hauser (USA) Holding, Inc.

(57) ABSTRACT

A method for verifying a clamp-on ultrasonic measurement device, wherein the measurement device comprises: at least two ultrasonic transducers configured to transmit and receive ultrasonic signals; and an electronic measuring/operating circuit configured to operate the ultrasonic transducers, to provide measured values of a measured variable, and to perform the verification, wherein the electronic measuring/operating circuit has a memory, the method comprising: mounting the measurement device on a standard measuring section; switching on a verification mode of the electronic measuring/operating circuit; transmitting an ultrasonic signal with at least one ultrasonic transducer and receiving the ultrasonic signal with at least one ultrasonic transducer; detecting a measured value of a verification variable of the ultrasonic signal and comparing the measured value with a specification value, stored in the memory, of the verification variable; outputting a verification result; and terminating the verification mode.

7 Claims, 3 Drawing Sheets

(58) Field of Classification Search
USPC .......................................................... 73/1.16
See application file for complete search history.

(56) References Cited

FOREIGN PATENT DOCUMENTS

| | | |  | |
|---|---|---|---|---|
| DE | 102015106897 A1 | 11/2016 | | |
| DE | 102015107750 A1 | 11/2016 | | |
| DE | 102018133476 A1 | 6/2020 | | |
| EP | 2607864 A1 | 6/2013 | | |
| WO | WO-2016177593 A1 | * 11/2016 | ............... | G01F 1/66 |
| WO | 2018162340 A1 | 9/2018 | | |
| WO | 2020126281 A1 | 6/2020 | | |

* cited by examiner

METHOD FOR VERIFYING A CLAMP-ON ULTRASONIC MEASURING DEVICE

CROSS-REFERENCE TO RELATED APPLICATIONS

The present application is related to and claims the priority benefit of German Patent Application No. 10 2020 127 360.6, filed on Oct. 16, 2020, and International Patent Application No. PCT/EP2021/075129, filed Sep. 13, 2021, the entire contents of which are incorporated herein by reference.

TECHNICAL FIELD

The invention relates to a method for verifying a clamp-on ultrasonic measurement device of measuring and automation technology in order to determine a state of the measurement device.

BACKGROUND

In the case of clamp-on ultrasonic measurement devices, as shown in DE102018133476A1, properties of the measurement device themselves change in the course of operation, as in all other measurement devices. This has negative effects on a measurement performance of such measurement devices, which is why the measurement devices undergo a condition check from time to time.

EP2607864B1 describes a method for in-line checking of a flowmeter, in which a calibrated, clamp-on ultrasonic measurement device is arranged in series with a flowmeter to be calibrated. For a condition check, the clamp-on ultrasonic measurement device is attached to a standard measuring section, and measurement results of measured variables are evaluated. It is checked whether the measured values are within a valid range.

The check is time-consuming, since the measured values first have to be transmitted to an evaluation device in order to then start the actual analysis.

SUMMARY

The object of the invention is to propose a simple and robust verification of a clamp-on ultrasonic measurement device.

The object is achieved by a method and by a clamp-on ultrasonic measurement device according to the present disclosure.

In a method according to the invention for verifying a clamp-on ultrasonic measurement device, the measurement device comprises:
at least two ultrasonic transducers configured to transmit and receive ultrasonic signals,
an electronic measuring/operating circuit configured to operate the at least one ultrasonic transducer and to provide measured values of at least one measured variable, and to perform the verification,
wherein the electronic measuring/operating circuit has a memory,
wherein the method has the following steps:
mounting the measurement device on a standard measuring section;
switching on a verification mode of the electronic measuring/operating circuit;
transmitting at least one ultrasonic signal with at least one ultrasonic transducer and receiving the ultrasonic signal with at least one ultrasonic transducer;
detecting at least one measured value of at least one verification variable of the ultrasonic signal and comparing the measured value with a specification value, stored in the memory, of the verification variable;
outputting a verification result;
terminating the verification mode.

In this way, verification can take place much faster and more easily than before.

In one embodiment of the method, the verification variable is a measured variable from the following list:
signal amplitude of a received ultrasonic signal;
signal transit time of an ultrasonic signal;
sonic velocity;
runtime difference of two ultrasonic signals which are transmitted and received in pairs by two ultrasonic transducers, in particular without the presence of a flowing medium;
signal-to-noise ratio;
signal form given, for example, by a rise time, fall time, amplitude, frequency;
correlation between a received ultrasonic signal and an expected ultrasonic signal.

In one embodiment of the method, the measuring section is one from the following list: measuring tube, measuring block, measuring rod.

A measuring tube can be without liquid, filled partially, or filled completely with a liquid. A measuring block or measuring rod makes it possible to check the adherence to target values very easily.

In one embodiment of the method, the measuring section is made at least of one of the following materials: plastic, metal.

By choosing a suitable material, the measuring section and the ultrasonic transducers can be matched to one another. Thus, transmission losses due to interface reflections can be reduced, for example.

In one embodiment of the method, the verification result comprises a profile of measured values with respect to a specification variable.

Thus, a statement can be made about a stability of a state of the measurement device.

In one embodiment of the method, the verification result includes a prediction with respect to a minimum operating time until leaving a target state.

In this way, a renewed verification of the measurement device can be planned ahead of time.

BRIEF DESCRIPTION OF THE DRAWINGS

The present disclosure will now be described with reference to exemplary embodiments as shown.

DETAILED DESCRIPTION

Figure 1:
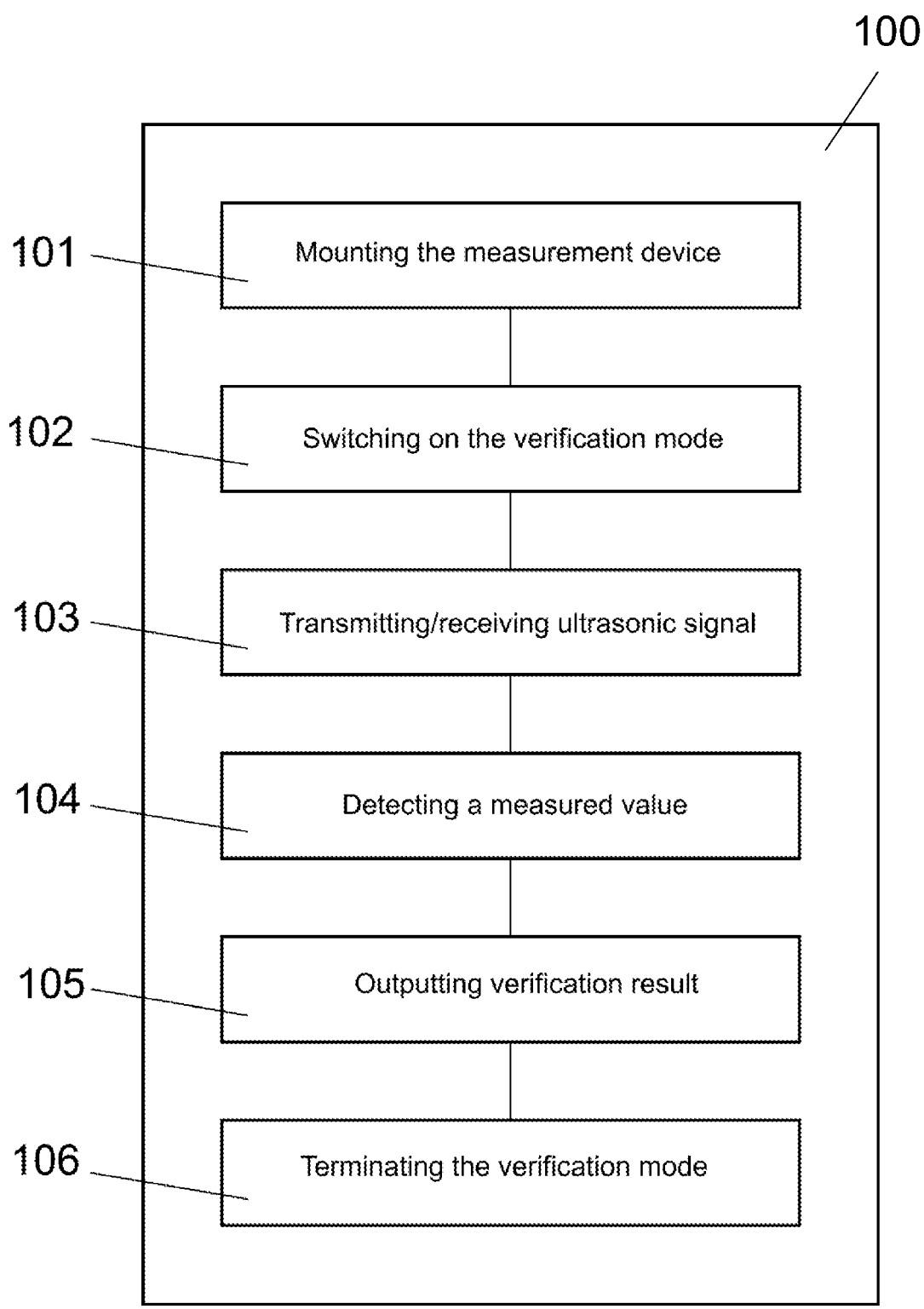
FIG. 1 describes a sequence of an exemplary method for verifying the clamp-on ultrasonic measurement device according to the present disclosure.

FIG. 1 describes a sequence of an exemplary method 100 according to the invention, in which, in a first method step

Figure 4A:
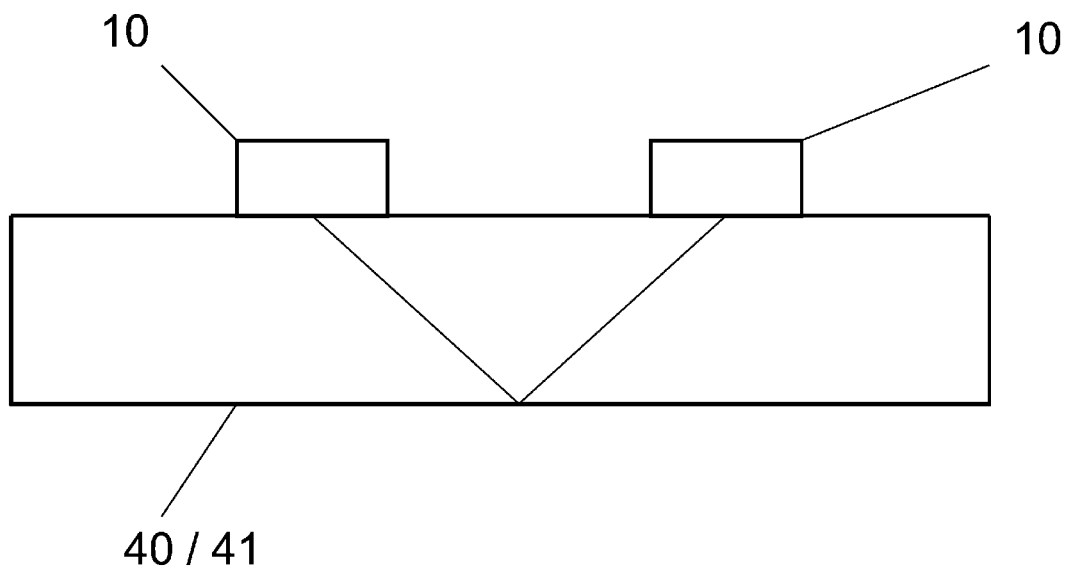
FIGS. 4a-4c show exemplary standard measuring sections for implementing the method.
Figure 4B:
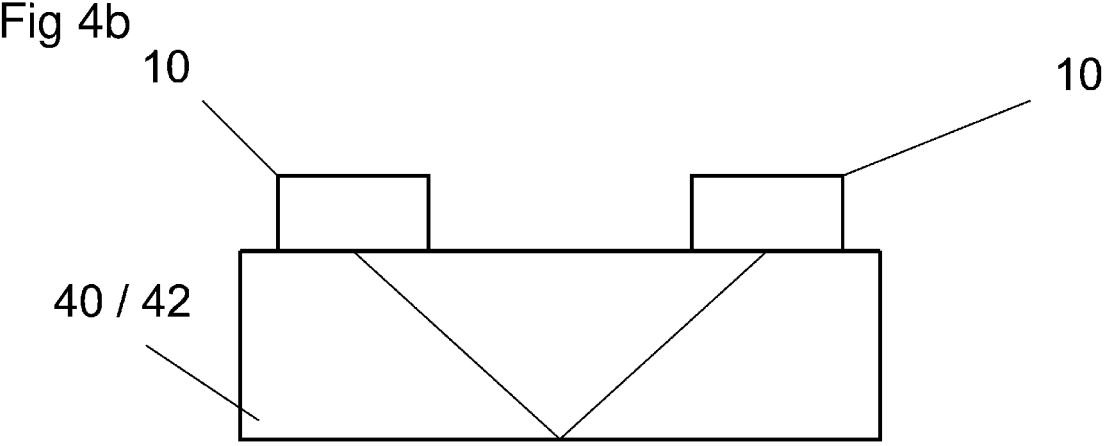
Figure 4C:
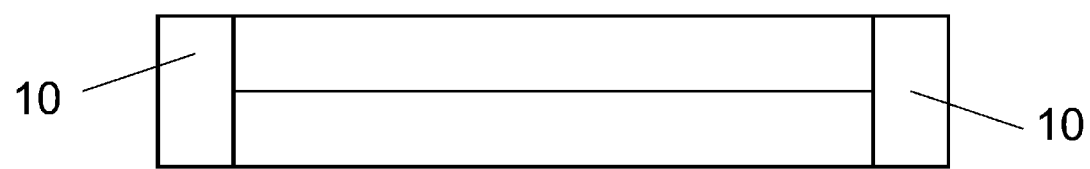

101, the clamp-on ultrasonic measurement device 1 is mounted on a standard measuring section 40, which standard measuring section 40 can be formed, for example, by a measuring tube 41, a measuring block 42, or a measuring rod 43; see FIGS. 4a-4c.

Figure 2:
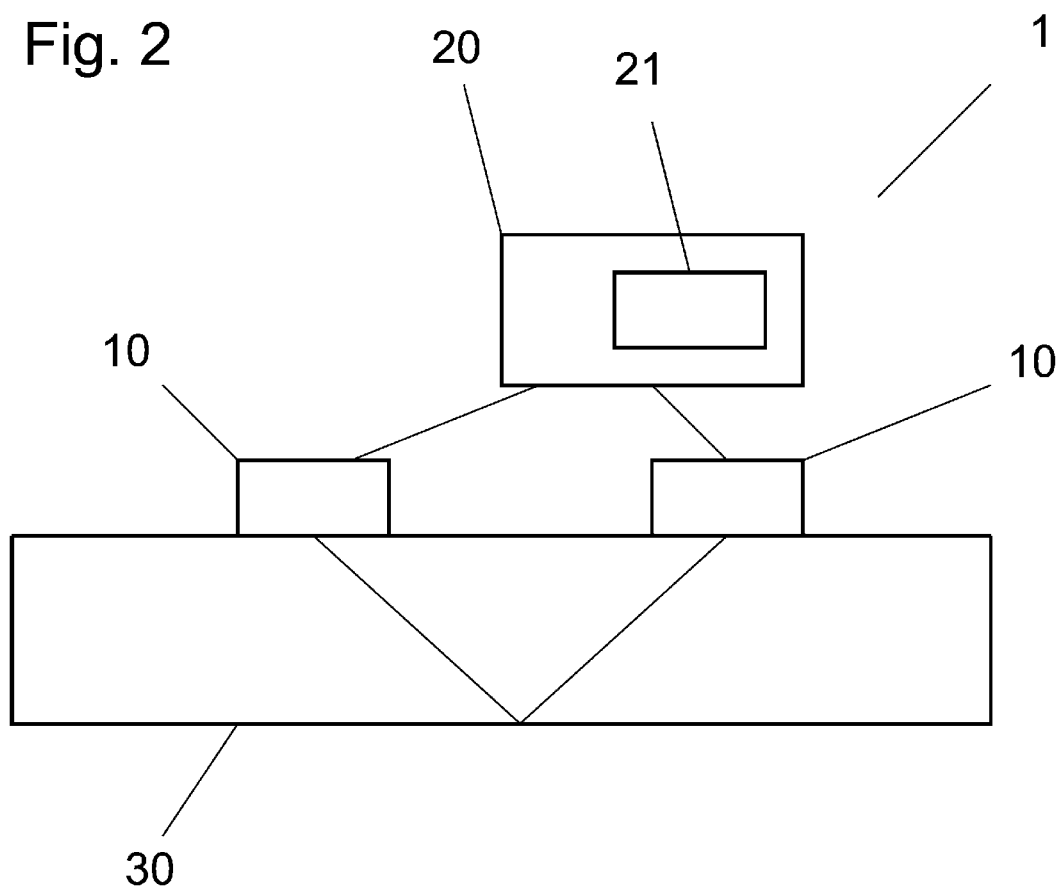
FIG. 2 shows an exemplary clamp-on ultrasonic measurement device according to the present disclosure.

In a second method step 102, a verification mode is switched on in an electronic measuring/operating circuit 20 of the clamp-on ultrasonic measurement device (see FIG. 2). In this case, parameters of a last-used measurement point can be stored, for example, so that the clamp-on ultrasonic measurement device can be newly set up without effort at this measurement point in the event of a positive verification result.

In a third method step 103, at least ultrasonic transducer 10 of the clamp-on ultrasonic measurement device is caused to transmit at least one ultrasonic signal, and at least one ultrasonic transducer is caused to receive the at least one ultrasonic signal.

In a fourth method step 104, the received ultrasonic signal is evaluated by the electronic measuring/operating circuit in order to determine at least one measured value of at least one verification variable of the ultrasonic signal.

A verification variable for determining a state of the clamp-on ultrasonic measurement device is a measured variable, for example, from the following list:
  signal amplitude of a received ultrasonic signal;
  signal transit time of an ultrasonic signal;
  sonic velocity;
  runtime difference of two ultrasonic signals which are transmitted and received in pairs by two ultrasonic transducers, in particular without the presence of a flowing medium;
  signal-to-noise ratio;
  signal form given, for example, by a rise time, fall time, amplitude, frequency;
  correlation between a received ultrasonic signal and an expected ultrasonic signal.

The person skilled in the art is not limited to this list and may also use further verification variables.

It is then checked whether the at least one measured value is within a target range. When determining measured values of several verification variables, it is correspondingly checked whether all measured values lie within associated target ranges. In this case, reference is made to at least one specification value stored in a memory/in a memory unit of the electronic measuring/operating circuit.

When the check is complete, a verification result is output in a fifth method step 105. The verification result can, for example, show whether the clamp-on ultrasonic measurement device can or cannot continue to be used. In one embodiment of the method, a minimum operating time of the clamp-on ultrasonic measurement device can be determined by an extended evaluation of the at least one measured value, so that a new verification of the clamp-on ultrasonic measurement device can be planned in advance. The extended evaluation can, for example, be based upon departures of the measured values from limit values of the associated target ranges. If several verification variables are used for verification, a verification result can be determined, for example, by means of a trained neural network, wherein training of the network can be carried out by inputting known measured values of verification variables and the associated state/status of the clamp-on ultrasonic measurement device.

In a sixth method step 106, the verification mode is ended, and, if the result is positive, the clamp-on ultrasonic measurement device is prepared for renewed use at a measuring point.

FIG. 2 outlines an exemplary clamp-on ultrasonic measurement device 1 according to the invention having two ultrasonic transducers 10 mounted on an outer side of a measuring tube 30 and having an electronic measuring/operating circuit 20 for operating the ultrasonic transducers and for providing measured values of at least one property of a medium located in the measuring tube. The media property can, for example, be one of the following measured variables: sound velocity, flow rate, volume flow, etc.

According to the invention, the electronic measuring/operating circuit has a memory unit 21 in which at least one specification value is stored, so that the method according to the invention can be carried out.

The mode of operation of clamp-on ultrasonic measurement devices per se is known to the person skilled in the art.

Figure 3:
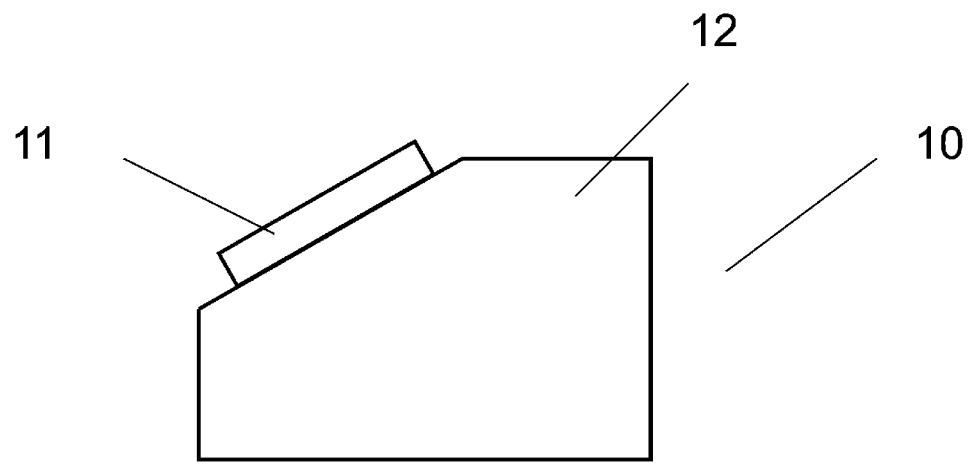
FIG. 3 shows an exemplary ultrasonic transducer.

FIG. 3 shows an exemplary ultrasonic transducer 10, which has a transducer element 11, in particular a piezo element, arranged on a coupling element/ultrasonic transmitter 12. The coupling element/ultrasonic transmitter is contacted with the measuring tube 30 above a side facing away from the transducer element and is configured to transmit ultrasonic signals between the transducer element and the measuring tube, and vice versa.

FIGS. 4a-4c sketch exemplary standard measuring sections 40, by means of which the clamp-on ultrasonic measurement device and, in particular, the ultrasonic transducers of the clamp-on ultrasonic measurement device can be verified in the sense of the method according to the invention.

FIG. 4a shows a standard measuring section with a measuring tube 41, to which the ultrasonic transducers 10 are attached. As sketched here, the arrangement can be designed such that an ultrasonic signal is easily reflected on a side, opposite the ultrasonic transducer, of the measuring tube 41 on a wall of the measuring tube. Since the measuring tube is used exclusively for verification purposes, it retains its properties and can therefore be repeatedly used for verification. The measuring tube can be at least partially filled with a liquid medium for verification. When using a measuring tube as the standard measuring section, several ultrasonic signal reflections occur at different interfaces of two different media, so that several ultrasonic signal reflections can be used for verification.

FIG. 4b shows a standard measuring section with a measuring block 42. With a measuring block, an ultrasonic signal reflection occurs primarily at interfaces between a surrounding area of the measuring block and the measuring block. This results in a more distinct and less noisy ultrasonic signal at a receiving ultrasonic transducer.

FIG. 4c sketches a standard measuring section with a measuring rod 43, wherein the ultrasonic transducers are arranged at opposite ends of the measuring rod. In this case, the ultrasonic signal does not undergo any reflection, but is, via the measuring rod, transmitted directly, i.e., without deflection, between the ultrasonic transducers.

The invention claimed is:

1. A method for verifying a clamp-on ultrasonic measurement device, wherein the measurement device comprises:
  at least two ultrasonic transducers configured to transmit and receive ultrasonic signals; and
  an electronic measuring/operating circuit configured to operate the at least two ultrasonic transducers, to determine measured values of at least one measured variable, and to perform the verification, wherein the electronic measuring/operating circuit includes a memory unit, the method comprising:
mounting the measurement device on a standard measuring section, wherein the standard measuring section is a measuring block or a measuring rod;
activating a verification mode of the electronic measuring/operating circuit;
transmitting at least one ultrasonic signal with an ultrasonic transducer of the at least two ultrasonic transducers;
subsequently receiving the ultrasonic signal with another ultrasonic transducer of the at least two ultrasonic transducers;
determining at least one measured value of at least one verification variable of the ultrasonic signal;
comparing the at least one measured value with at least one specification value, stored in the memory unit, of the at least one verification variable;
outputting a verification result based on the comparing of the at least one measured value with the at least one specification value; and
deactivating the verification mode.

2. The method of claim 1, wherein the at least one verification variable is one of:
a signal amplitude of a received ultrasonic signal;
a signal transit time of an ultrasonic signal;
a sonic velocity;
a runtime difference of two ultrasonic signals that are transmitted and received in pairs by the at least two ultrasonic transducers without the presence of a flowing medium in the standard measuring section;
a signal-to-noise ratio;
a signal form given by a rise time, fall time, amplitude or frequency; and
a correlation between a received ultrasonic signal and an expected ultrasonic signal.

3. The method of claim 1, wherein the standard measuring section is made of at least one of: plastic and metal.

4. The method of claim 1, wherein the verification result comprises a profile of measured values with respect to a specification variable.

5. The method of claim 1, wherein the verification result includes a prediction with respect to an operating time until a new verification of the measurement device is to be performed.

6. A clamp-on ultrasonic measurement device configured to implement the method according to claim 1, the measuring device comprising:
at least two ultrasonic transducers configured to transmit and receive ultrasonic signals, the at least two ultrasonic transducers mounted or mountable on a measuring tube;
an electronic measuring/operating circuit configured to operate the at least two ultrasonic transducers, to determine measured values of at least one measured variable, and to perform the verification,
wherein the electronic measuring/operating circuit includes a memory unit in which at least one specification value is stored.

7. The method of claim 5, wherein the prediction is based on an evaluation of the at least one verification variable relative to limit values of associated target ranges of the at least one verification variable.

* * * * *